United States Patent [19]
Kanemitsu

[11] Patent Number: 5,559,612
[45] Date of Patent: Sep. 24, 1996

[54] IMAGE READING DEVICE WITH BLACK AND WHITE PLATEN

[75] Inventor: Norio Kanemitsu, Kawasaki, Japan

[73] Assignee: Fujitsu Limited, Kanagawa, Japan

[21] Appl. No.: 406,401

[22] Filed: Mar. 20, 1995

[30]     Foreign Application Priority Data

Apr. 6, 1994  [JP]  Japan .................. 6-067501

[51] Int. Cl.⁶ ........................................ H04N 1/04
[52] U.S. Cl. ........................................ 358/471; 358/475
[58] Field of Search ........................ 355/234–235, 355/230, 75; 358/449, 461, 464, 471, 475, 516

[56]              References Cited
              U.S. PATENT DOCUMENTS

| 4,521,099 | 6/1985 | Katayama et al. | 355/234 |
| 4,596,456 | 6/1986 | Ide | 355/234 |
| 4,945,384 | 7/1990 | Yamada et al. | 355/235 |
| 4,990,956 | 2/1991 | Iwata | 355/230 |
| 5,068,913 | 11/1991 | Sugiura | 358/449 |
| 5,384,621 | 1/1995 | Hatch et al. | 355/230 |
| 5,483,356 | 1/1996 | Chen et al. | 358/471 |
| 5,499,112 | 3/1996 | Kawai et al. | 358/475 |

Primary Examiner—Stephen Brinich
Attorney, Agent, or Firm—Nikaido Marmelstein Murray & Oram LLP

[57]              ABSTRACT

The image reading device including a light source for irradiating an original, an image sensor for reading information on the original to produce an image, and a platen adapted to contact the original at the reading station. The platen includes a first, black portion located under the original and a second, white portion located outside the original. The widths of the first and second portions are automatically changed. The platen is formed by an endless belt having a triangular black region and a complementary white region. The endless belt is moved so that the width of the triangular black region at the reading position corresponds to the width of the original. The platen is alternatively formed as a box-shaped member or of liquid crystal panel.

19 Claims, 14 Drawing Sheets

IMAGE READING DEVICE WITH BLACK AND WHITE PLATEN

BACKGROUND OF THE INVENTION

1. Field of the Invention

The present invention relates to an image reading device having a platen with a black portion and a white portion.

2. Description of the Related Art

Image reading devices are used, for example, as input devices in facsimile apparatuses and in computers. The image reading devices include a housing having a reading station therein, a light source for irradiating an original (such as printed paper) bearing information thereon with light, and an image sensor receiving the light reflected by the original for reading the information on the original to produce an image. The image sensor is typically formed by an array of CCD elements. The irradiated light is reflected by the upper surface of the original and the image sensor can thus read the information on the upper surface of the original.

Figure 20:
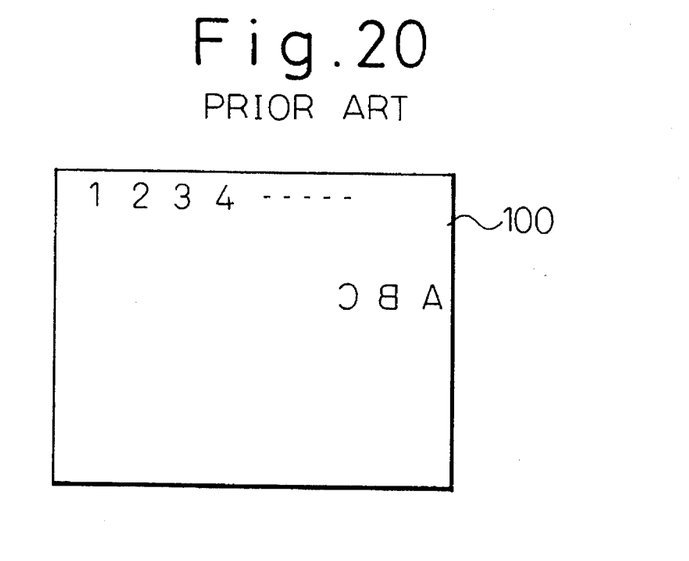
FIG. 20 is a view of an image in the conventional image reading device with an entirely white platen.

A platen is arranged at the reading station in the housing of the image reading device. The platen is usually formed by an entirely white plate or white colored metal. Alternatively, the platen is sometimes formed by an entirely black plate or black colored metal. If a white platen is used and when a relatively thin original bearing information on both surfaces thereof is inserted into the image reading device, a portion of the irradiated light is reflected by the upper surface of the original but another portion of the irradiated light passes through the original and reflected by the upper surface of the platen. The light reflected by the upper surface of the platen again passes through the original and reaches the image sensor with the result that information on the lower surface of the original is also read by the image sensor. Therefore, the information from both surfaces of the original appears when the image is produced, as shown in FIG. 20 of the attached drawings. In FIG. 20, the characters "1, 2, 3, 4, . . . " show information carried by the upper surface of the original and the characters "A, B, and C" show information carried by the lower surface of the original.

Figure 21:
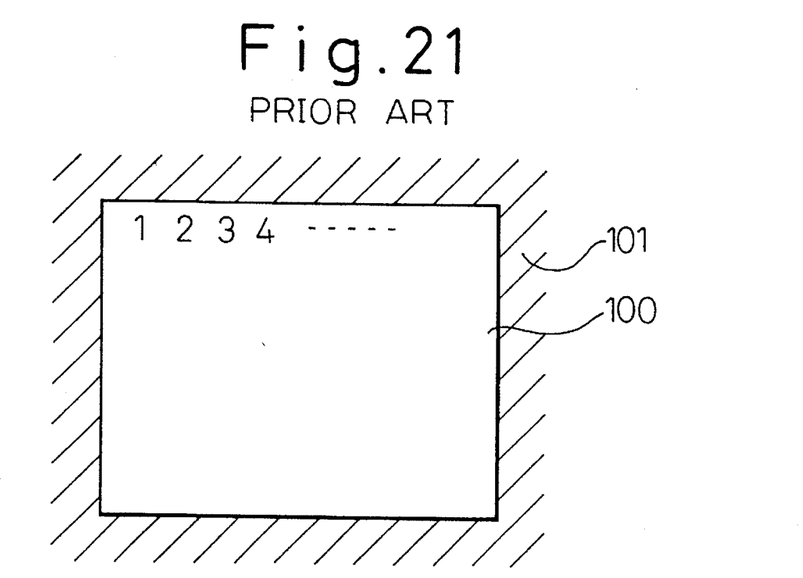
FIG. 21 is a view of an image in the conventional image reading device with an entirely black platen.

A black platen can solve this problem because the portion of the irradiated light that passes through the original is not reflected by the upper surface of the platen. However, the region of the platen outside the original is also read as if the black surface is information, and a black area 101 appears around the image of the original 100, as shown in FIG. 21. Such black area on the image could be removed by monitoring a display and using a mouse in a computer application, for example.

SUMMARY OF THE INVENTION

The object of the present invention is to provide an image reading device which can clearly and reliably read information on an original even when a relatively thin original including information on both surfaces thereof is inserted into the image reading device.

According to the present invention, there is provided an image reading device comprising: a housing having a reading station therein; a light source for irradiating a first surface of an original with light at the reading station; reading means receiving light reflected by the first surface of the original for reading information on the original to produce an image; and platen means adapted to contact a second surface of the original opposite the first surface thereof at the reading station, the platen means including first and second variable portions depending on a position of a particular original so that the first portion appears substantially black in view of a reflection and a transmission of a light and the second portion appears substantially white in view of a reflection and a transmission of a light.

In a preferred embodiment, the platen means comprises a movable member such as an endless belt, and moving means for moving the movable member in a first direction, the movable member including a substantially black region and a substantially white region, the ratio of a width of the substantially black region relative to a width of the substantially white region continuously changing by moving the movable member. Preferably, the substantially black region is shaped in a triangular shape.

Preferably, the image reading device further comprises an inlet and an outlet arranged in said housing, means for conveying the original from the inlet through the reading station toward the outlet, and detecting means for detecting the size of the original, control means controlling said moving means in response to an output from said detecting means.

In a further preferred embodiment, the platen means comprises a liquid crystal device, and control means controls the liquid crystal device such that light is blocked by a region of the liquid crystal device under the original and is transmitted through another region of the liquid crystal device outside the original.

Preferably, the image reading device further comprises an inlet and an outlet arranged in said housing, means for conveying the original from the inlet through the reading station toward the outlet, and detecting means for detecting a size of the original, said control means controlling the liquid crystal device in response to an output from said detecting means.

In a further preferred embodiment, the platen means comprises a box-shaped member including a top transparent layer onto which the original can be placed and a bottom layer with an inside reflective surface. A part of a light irradiated from the light source and made incident to the first surface of the original is reflected by the first surface of the original for reading information thereon, and another part of the incident light is transmitted through the original and the top transparent layer without substantial reflection at the interface between the original and the top transparent layer. Light irradiated from the light source and made incident to a region of the top transparent layer outside the original is transmitted through the top transparent layer and reflected by the inside reflective surface of the bottom layer to thereby cause a region of the box-shaped member outside the original.

BRIEF DESCRIPTION OF THE DRAWINGS

The present invention will become more apparent from the following description of the preferred embodiments, with reference to the accompanying drawings in which.

DESCRIPTION OF THE PREFERRED EMBODIMENTS

Figure 1:
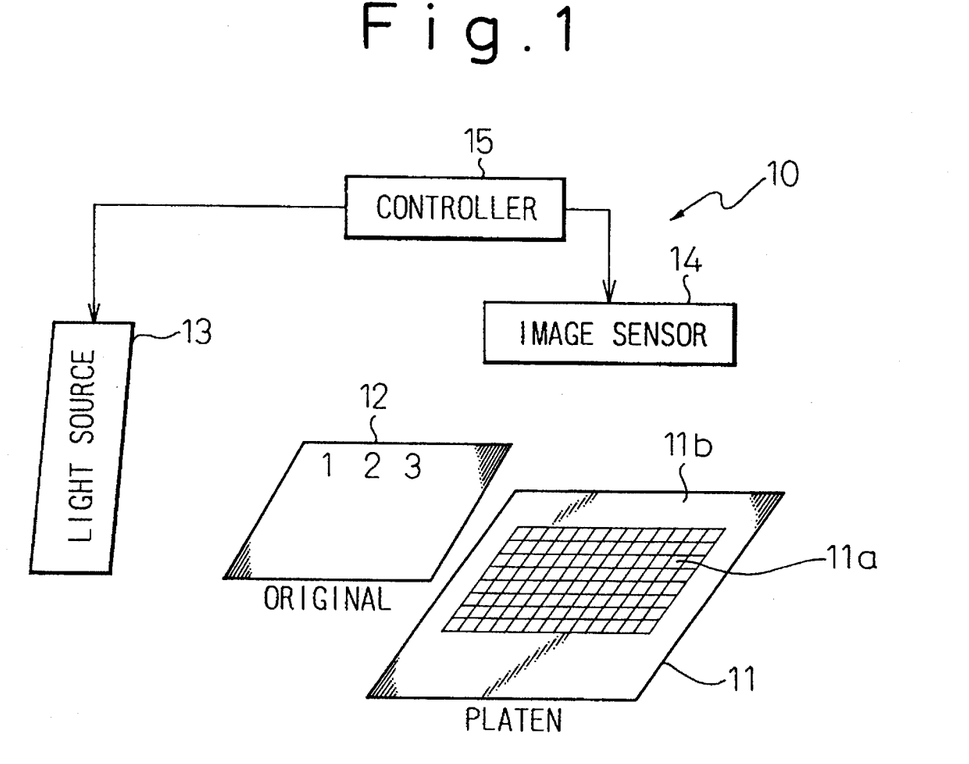
FIG. 1 is a block diagram illustrating a principle of an image reading device of the present invention.

FIG. 1 shows the concept of an image device of the present invention, in which the image reading device 10 includes a platen 11 on which an original 12 bearing information rests. The original may be a printed paper or the like. A light source 13 is arranged to irradiate the original 12 with a light, and an image sensor 14 including CCD elements reads the information on the original 12. A controller 15 controls the image sensor 14 and the light source 13.

The platen 11 includes first and second variable portions 11a and 11b depending on a position of a particular original 12 so that the first portion 11a is located under the original 12 and appears substantially black in view of reflection and transmission of light and the second portion 11b is located outside the original 12 and appears substantially white in view of reflection and transmission of light.

Figure 19A:
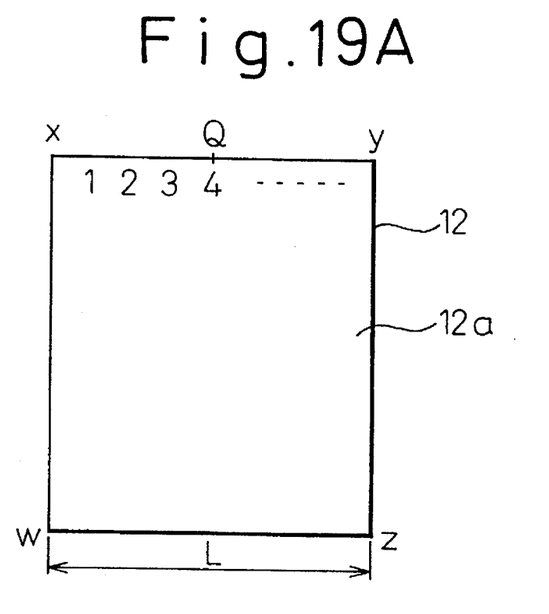
FIGS. 19A and 19B are views illustrating upper and lower surfaces of an original.
Figure 19B:
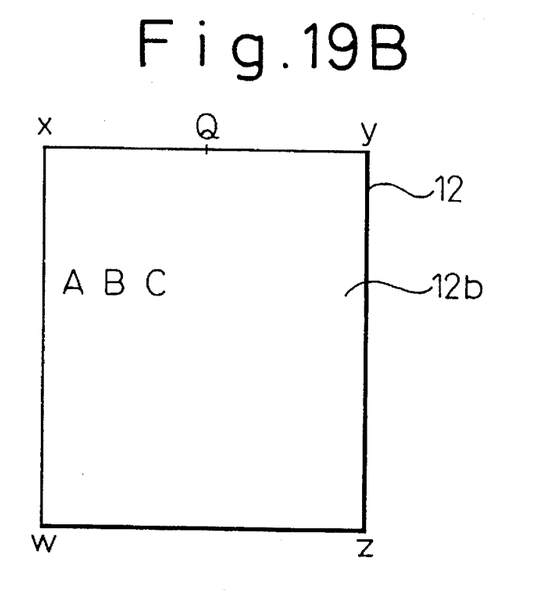

FIGS. 19A and 19B are views illustrating an upper surface 12a and a lower surface 12b of the original 12. The characters "1, 2, 3, 4, . . . " show information carried by the upper surface 12a of the original 12 and the characters "A, B, and C" show information carried by the lower surface 12b of the original 12. The characters "x, y, z, and w" show the corners of the original 12, and the character "L" shows the width of the original 12 in the conveying direction ill the image reading device 10. The character "Q" is the center of the leading edge of the original 12.

Figure 2A:
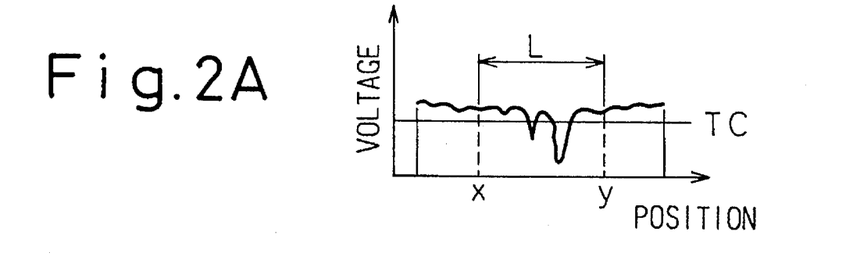
FIG. 2A is a waveform view of the CCD output signal.
Figure 2B:
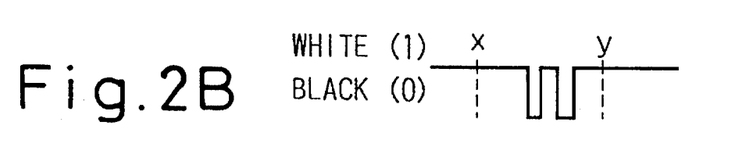
FIG. 2B is a waveform view of the digital output signal corresponding to the CCD output signal of FIG. 2A.

FIGS. 2A and 2B are the CCD output signal and its digital output signal during one scanning operation. When light is irradiated onto the upper surface 12a of the original 12 and the upper surface of the second portion 11b of the platen 11, a great amount of light is reflected by these upper surfaces 12a and 11b, but a small amount of light may pass through the original 12. The latter light is not substantially reflected by the upper surface of the first, black portion 11a of the platen 11 because this portion 11a is black. Therefore, the CCD output signal corresponding to information on the lower surface 12b of the original 12 is very small even if such information is picked up. The CCD output signal which is lower than a threshold voltage TC is converted into a digital signal representing a black point. Accordingly, when the upper surface 12a is irradiated with a light, a clear image corresponding to information carried by the upper surface 12a of the original 12 is produced. Even if information exists at the peripheral region of the upper surface 12a of the original 12, a clear image can be produced.

Figure 3:
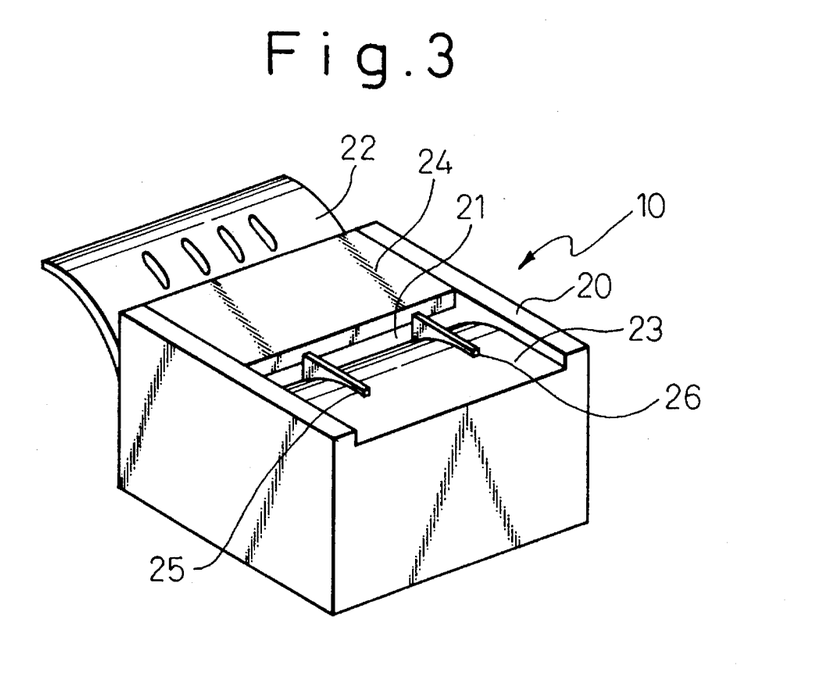
FIG. 3 is a perspective view of an image reading device according to the first embodiment of the present invention.
Figure 4:
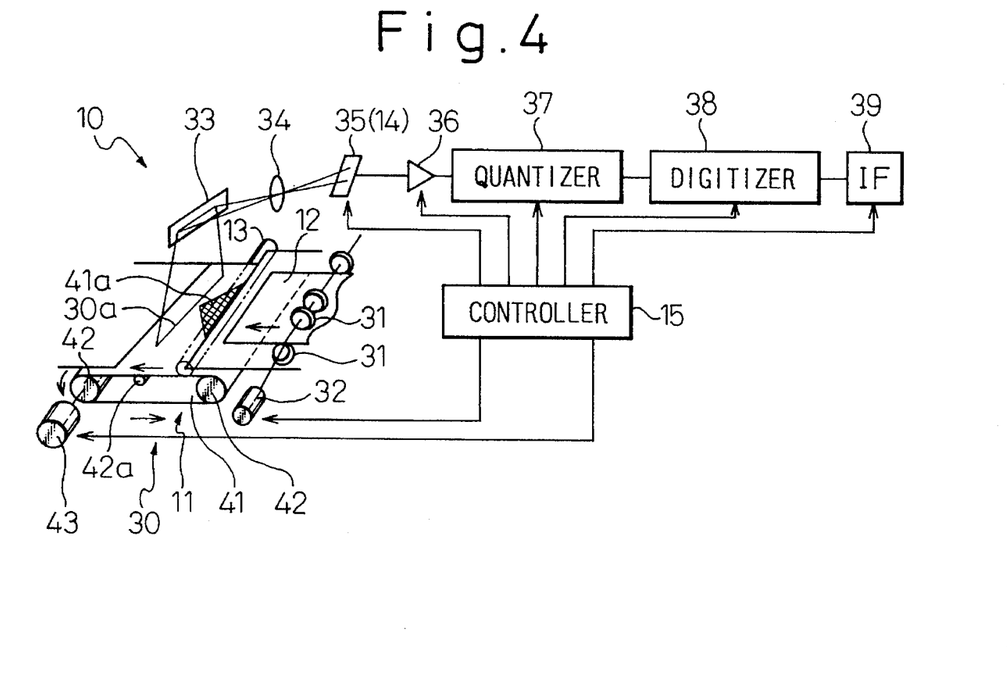
FIG. 4 is a perspective view of the components in the image reading device of FIG. 3.
Figure 5:
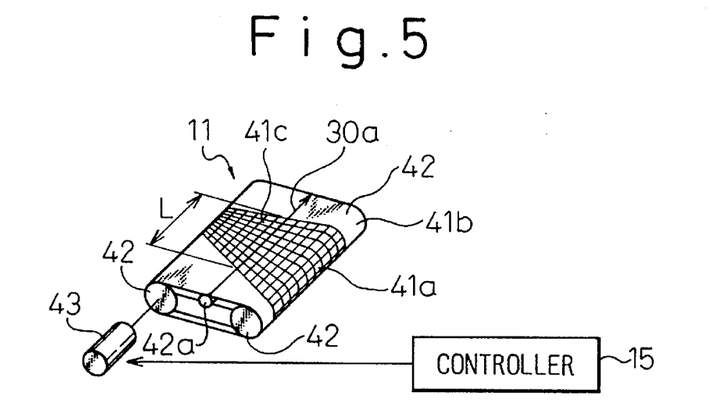
FIG. 5 is a perspective view of the platen of the image reading device of FIG. 4.

FIGS. 3 to 5 show the first preferred embodiment of the present invention. In FIG. 3, the image reading device 10 includes a housing 20 having an inlet 21 and an outlet tray 22 for the original 12. The inlet 21 is formed between a sloped guide wall 23 and a top wall 24, and a pair of side guides 25 and 26 are arranged on the sloped guide wall 23. The side guides 25 and 26 can be moved together toward and away from each other in synchronism to guide the lateral sides of the original 12. The synchronous side guides 25 and 26 are well known and a description of the detailed mechanism thereof is omitted here.

The housing 20 includes a reading station 30 at which the platen 11 and the light source 13 are arranged, as shown in FIG. 4. Feed rollers 31 are arranged for conveying the original 12 from the inlet 21 to the reading station 30 and from the reading station 30 toward the outlet tray 22. An electric motor 32 actuates the feed rollers 31 under the control of the controller 15. The image sensor 14, including CCD elements 35, receives light reflected by the original 12 via a mirror 33 and an optical lens 34. The CCD elements 35 are scanned to read the original 12 along a predetermined reading line or a scanning line 30a. The image reading device 10 also includes an amplifier 36, an quantizer 37, a digitizer 38, and an interface (IF) 39 for connection to an external device. The controller 15 controls these components.

The platen 11 comprises a movable member 41 in the form of an endless belt running around a pair of rollers 42, and an electric motor 43 coupled to one of the rollers 42, as shown in FIGS. 4 and 5. The electric motor 43 is controlled by the controller 15 to bring the movable member 41 into an appropriate position when the original 12 is inserted. There is an additional idle roller 42a in correspondence with the reading line 30a.

The movable member 41 includes a substantially black region 41a and a substantially white region 41b, the ratio of the width of the region 41a relative to the width of the region 41b continuously changing in the conveying direction. The movable member 41 can be made from any material which is adapted to be printed black and white. For example, the movable member 41 can be made from rubber, plastic film, or a woven or a nonwoven fabric. The substantially black region 41a is preferably colored black. However, the color should be selected in view of the reflection and the transmission of light, and the substantially black region 41a can thus be colored grey or green, for example.

Figure 6:
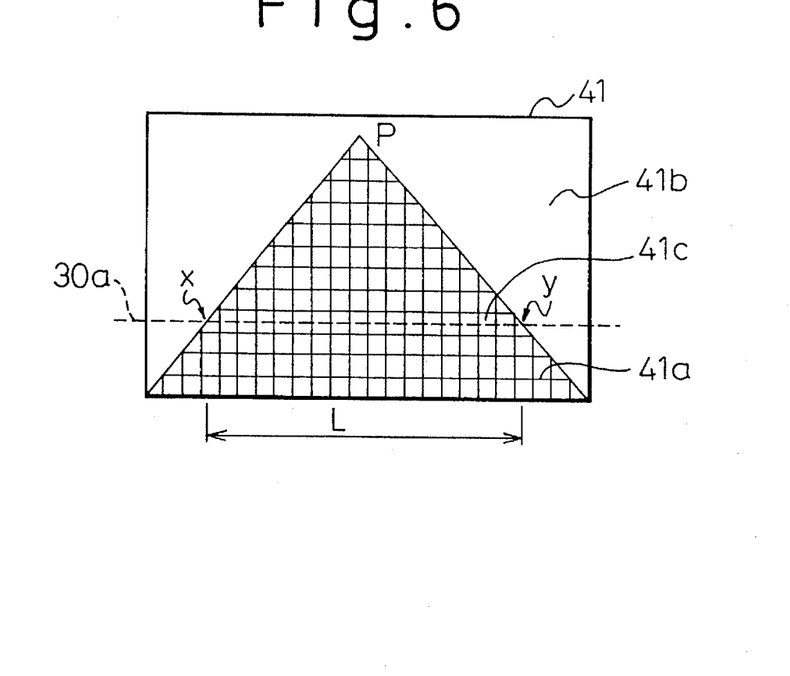
FIG. 6 is a diagrammatic plan view of the platen having an isosceles triangular black region.
Figure 7:
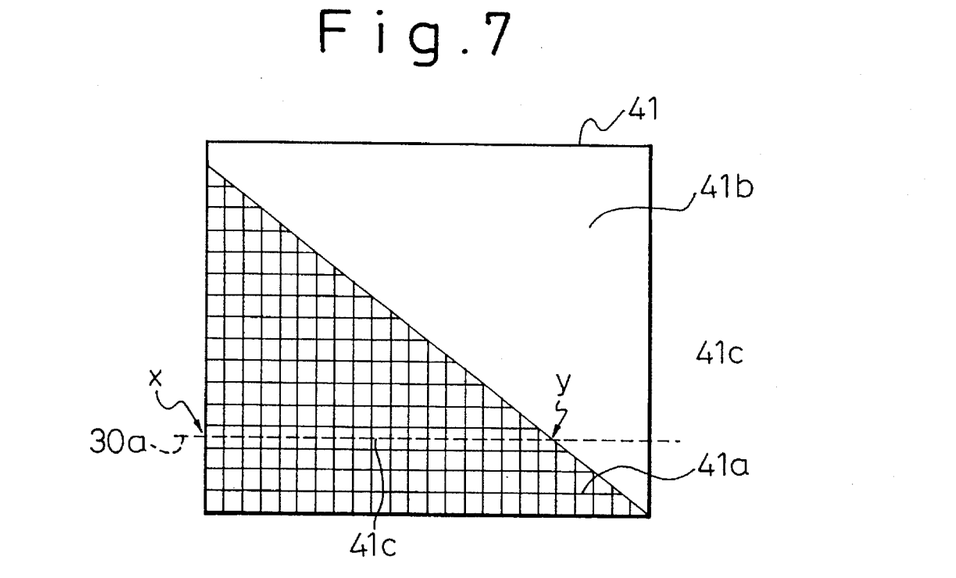
FIG. 7 is a diagrammatic plan view of the platen having a right-angled triangular black region.

The substantially black region 41a preferably has a triangular shape, in particular, in an isosceles triangular shape, as shown in FIGS. 4 to 6. Alternatively, the substantially black region 41a can have a right-angled triangular shape, as shown in FIG. 7.

It is to be noted that the first portion 11a of the platen 11 (as exemplified in FIG. 1) does not necessarily have uniform width over the length of the platen 11, but it is only necessary that the portion of the platen 11 that is located on the reading line 30a (the reading line 30a has a small width in the conveying direction) is substantially black, because the original 12 is scanned at the reading line 30a while the original 12 is continuously conveyed. Therefore, the movable member 41 is moved so that a portion 41c of the substantially black region 41a, which has the width corresponding to the width L of the original 12, is brought to the reading line 30a, as shown in FIGS. 5 and 6.

Figure 8:
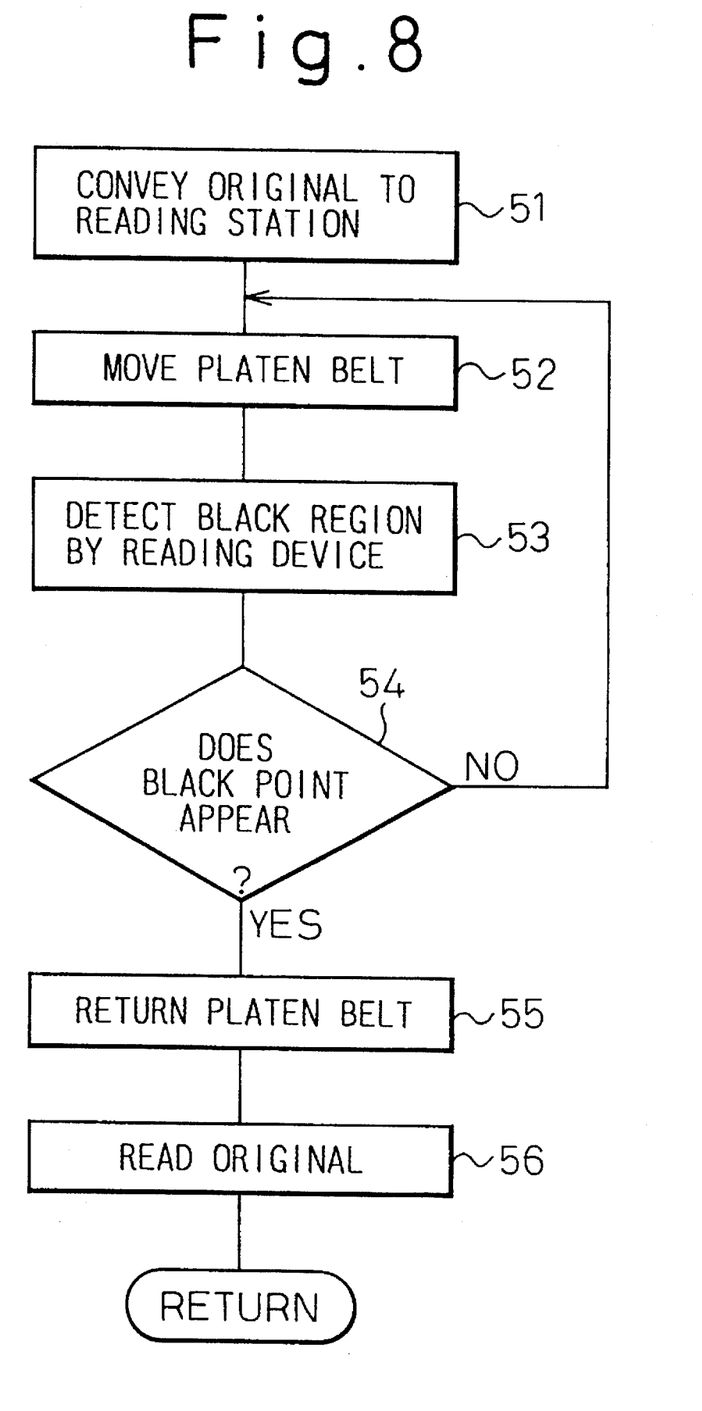
FIG. 8 is a flow chart for controlling the platen and the image reading device.

The operation of the image reading device 10 is described with reference to the flow chart of FIG. 8. In step 51, the original 12 is conveyed to the reading station 30 in the direction of the arrow in FIG. 4, by actuating the original motor 32. When the leading edge of the original 12 reaches the reading line 30a, the original motor 32 is stopped. The leading edge of the original 12 can be detected by a photocoupler (not shown) including a light emitting diode and a light receiving transistor. The photocoupler can be arranged near the conveying rollers 31, and the original motor 32 continues to operate for a predetermined time or a number of steps after the leading edge of the original 12 is detected, to convey the original 12 a predetermined distance from the photocoupler to the reading line 30a, whereby the leading edge of the original 12 stops on the reading line 30a.

Figure 9:
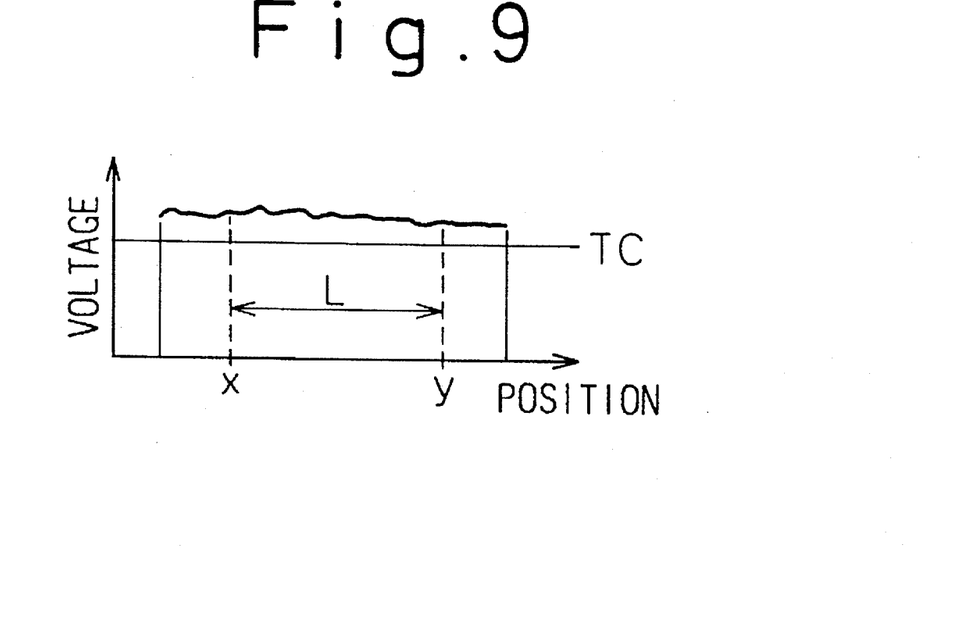
FIG. 9 is a waveform view of the CCD output signal when the platen is in the initial position.

In step 52, the platen belt, i.e., the movable member 41 in the form of the endless belt, is moved in the direction of the arrow in FIG. 4, by actuating the platen motor 43. In step 53, the image sensor 14 (CCD elements 35) starts scanning to detect a black region appearing on the reading line 30a. In the initial position of the movable member 41, the apex P of the substantially black region 41a of the movable member 41 is located on the downstream side of the reading line 30a, and the substantially white region 41b only is located on the reading line 30a. The output signal of the image sensor 14 in the initial stage is shown in FIG. 9, in which the output signal is higher than the threshold voltage TC, and it is detected that there is no black region.

Figure 10:
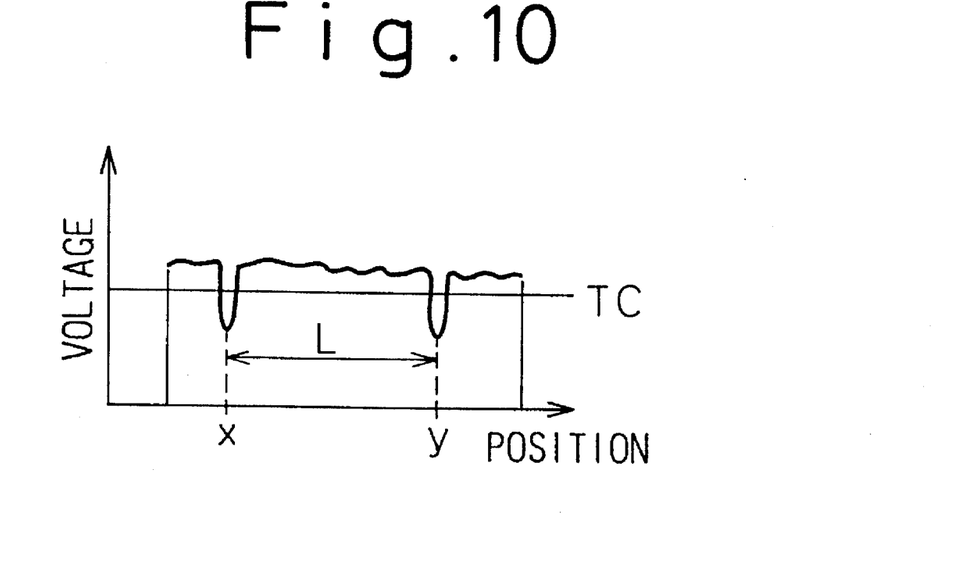
FIG. 10 is a waveform view of the CCD output signal when the platen is in the reading position.

In step 54, it is determined whether a black point appears or not. The result of step 54 in the initial stage will be NO, and steps 52 to 54 are repeated while the movable member 41 continues to run. A portion 41c of the substantially black region 41a having the width corresponding to the width L of the original 12 will eventually reach the reading line 30a. When the portion 41c passes just beyond the reading line 30a, the following portion of the substantially black region 41a having the width greater than the width L of the original 12 will reach the reading line 30a. In this instance, the outer edges of the substantially black region 41a are exposed by the original 12. The image sensor 14 detects the black outer edges. The output signal of the image sensor 14 in this stage is shown in FIG. 10, in which the output signal of the image sensor 14 detecting the black outer edges of the substantially black region 41a is lower than the threshold voltage TC, and a black point is thus detected.

If the result of step 54 may become YES, the platen motor 43 is reversely rotated to slightly return the movable member 41, so that the portion 41c of the substantially black region 41a is positioned at the reading line 30a and a black portion does not appear outside the lateral edges of the original. It is also possible that the movable member 41 is slightly excessively returned so that the portion 41c is on the downstream side of the reading line 30a. In step 56, the image sensor 14 then starts the actual scanning to read the original 12 while the original 12 is being conveyed.

The movable member 41 having the isosceles triangular black region 41a of FIG. 6 can be used when the side guides 25 and 26 are moved together toward and away from each other in synchronism, as shown in FIG. 3. If one of the side guides 25 and 26 is fixed and the other is movable, the movable member 41 having the right-angled triangular black region 41a of FIG. 7 can be used, with the side s-t in abutment with fixed guide. In FIG. 8, the image sensor 14 also has the function of detecting a size of the original 12. It is also possible to use any type of sensor to detect the size of the original 12.

Figure 11:
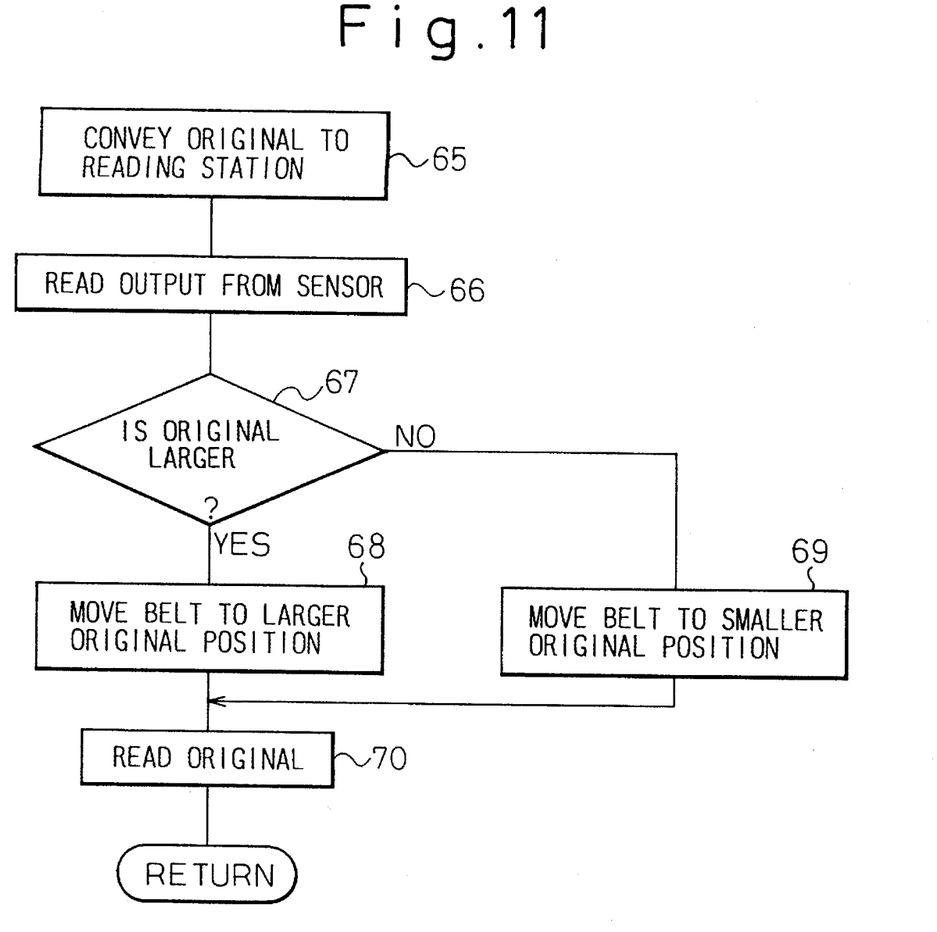
FIG. 11 is a flow chart for controlling the platen and the image reading device in response to a size sensor.
Figure 12:
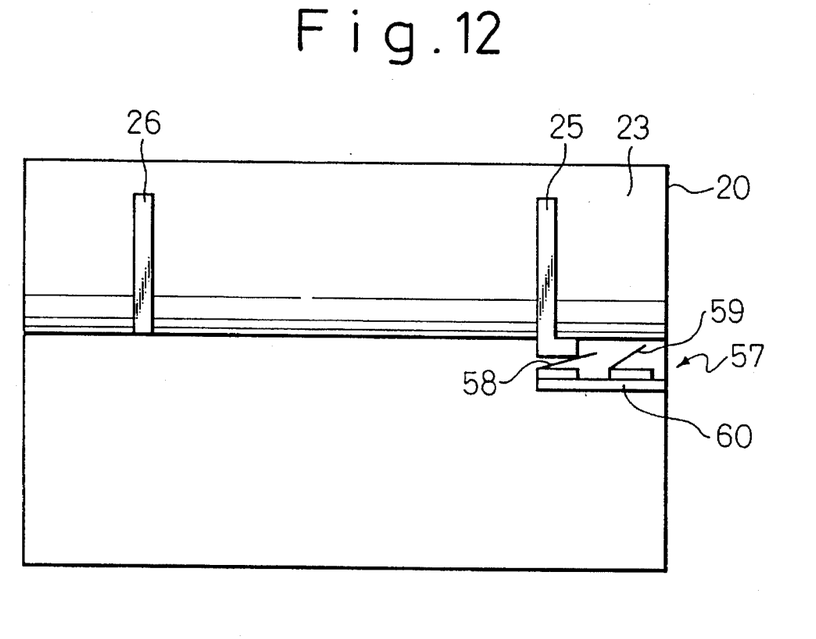
FIG. 12 is an elevational view illustrating a size sensor associated with the side guides in the housing of the image reading device.

FIG. 11 shows another flow chart for controlling the platen 11 and the image reading device 10. This flow chart uses an output from a size sensor 57 in FIG. 12. In FIG. 12, the size sensor 57 is associated with one of the side guides 25 in the housing 20 of the image reading device 10. The size sensor 57 comprises two micro switches 58 and 59 attached to a bracket 60. It is supposed here to clarify the description that the original 12 has a standard size and only two kinds of originals are used, called a larger original and a smaller original. If more than two kinds of originals are used, the number of the micro switches should be increased. As will be apparent, the micro switch 58 detects a smaller original and the micro switch 59 detects a larger original. Also, it is possible to infinitely detect any size of an original.

In step 65 of FIG. 11, the original 12 is conveyed to the reading station 30 by actuating the original motor 32. In step 66, the output from the size sensor 57 is read. In step 67, it is determined whether the inserted original 12 is a larger original or not. If the result in step 67 is YES, the program goes to step 68 in which the platen belt, i.e., the movable member 41 in the form of the endless belt, is moved to the larger original position, by actuating the platen motor 43. If the result in step 67 is NO, the program goes to step 69 in which the movable member 41 is moved to the smaller original position. Therefore, the portion 41c of the substantially black region 41a having the width corresponding to the width L of the larger or smaller original 12 will reach the reading line 30a. The program goes to step 70, in which the image sensor 14 starts to read the original 12 while the original 12 is being conveyed.

Figure 13:
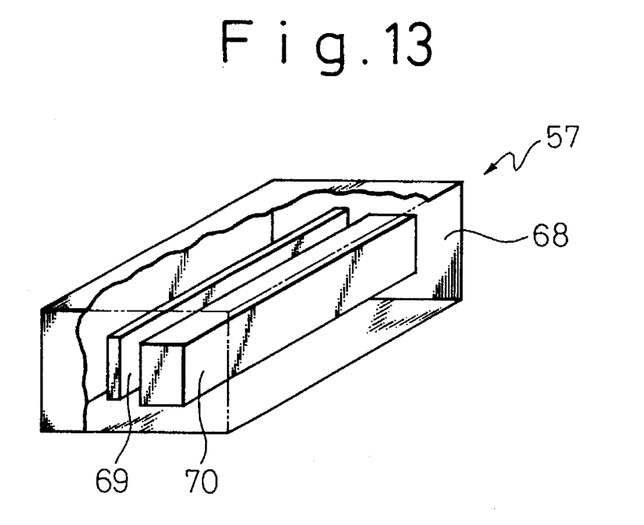
FIG. 13 is a partially cutaway perspective view of another size sensor.

FIG. 13 shows another size sensor 57 called a contact type sensor. The sensor 57 comprises a casing 68, an elongated light emitting diode 69, and an array of light receiving elements 70. The sensor 57 is arranged in a conveying path of the original 12 so that the original 12 contacts the upper surface of the casing 68. When the original 12 travels along the sensor 57, a light from the light emitting diode 69 is reflected by the original 12 and received by the light receiving elements 70. Accordingly, the sensor 57 can detect the size of the original 12 even if the size of the original 12 is not standard. It will be understood that the output of the sensor 57 can be used in a manner similar to that of the sensor in FIG. 11.

Figure 14:
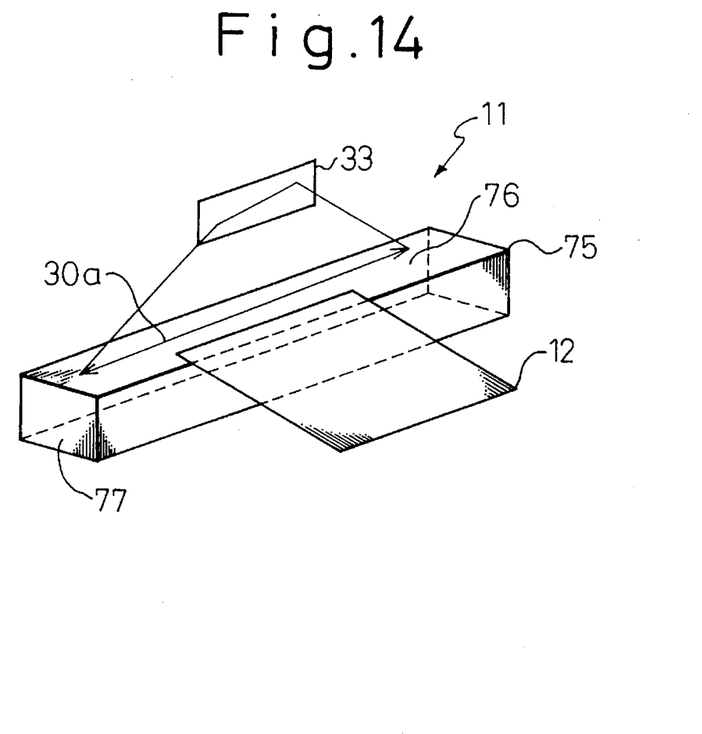
FIG. 14 is a perspective view of a platen according to the second embodiment of the present invention.
Figure 15:
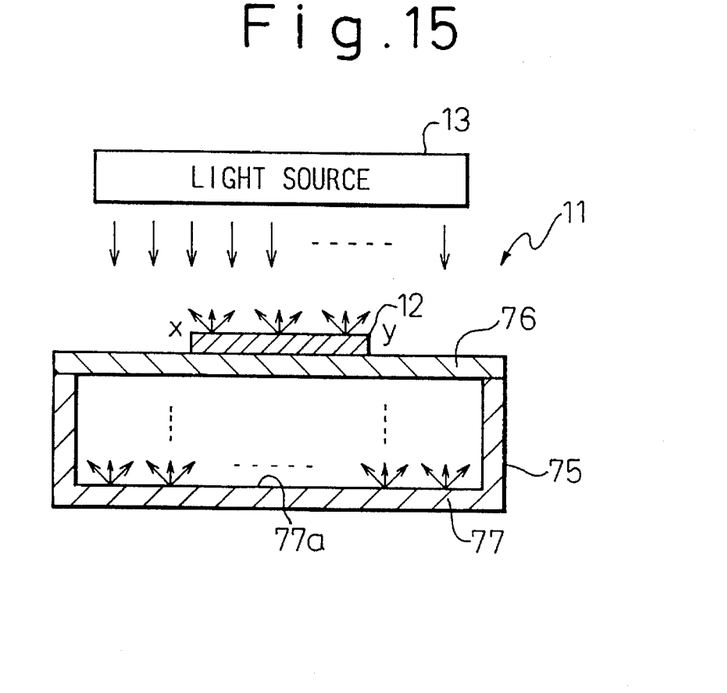
FIG. 15 is a cross-sectional view of the platen of FIG. 11.

FIGS. 14 and 15 show the platen 11 of the second preferred embodiment of the present invention. It will be understood that this platen 11 can be used in the image reading device 10 of FIGS. 3 and 4, in place of the platen 11 in FIGS. 3 and 4.

In FIGS. 14 and 15, the platen 11 comprises a box-shaped member 75 including a top transparent layer 76 on which the original 12 rests and a bottom layer 77 with an inside reflective surface 77a. There is a gap between the top transparent layer 76 and the bottom layer 77. The gap may be approximately 1 centimeter. The top transparent layer 76 is formed from glass or plastic. The inside reflective surface 77a of the bottom layer 77 is preferably colored white.

In this arrangement, a part of the light irradiated from the light source, 13 and made incident to the upper surface of the original 12 is reflected by the upper surface of the original 12 for reading information thereon. Another part of the light made incident to the upper surface of the original 12 is transmitted through the original 12 and the top transparent layer 76 without substantial reflection by the upper surface of the top transparent layer 76. The light passing through the original 12 and the top transparent layer 76 will be reflected by the inside reflective surface 77a of the bottom layer 77, and may be again incident to the top transparent layer 76 and the original 12. However, this reflected light is weak and is scattered, so information on the lower surface of the original 12 is not read by the image sensor 14.

A light irradiated from the light source 13 and made incident to a portion of the top transparent layer 76 outside the original 12 is transmitted through the top transparent layer 76 and reflected by the inside reflective surface 77a of the bottom layer 77.

Figure 16:
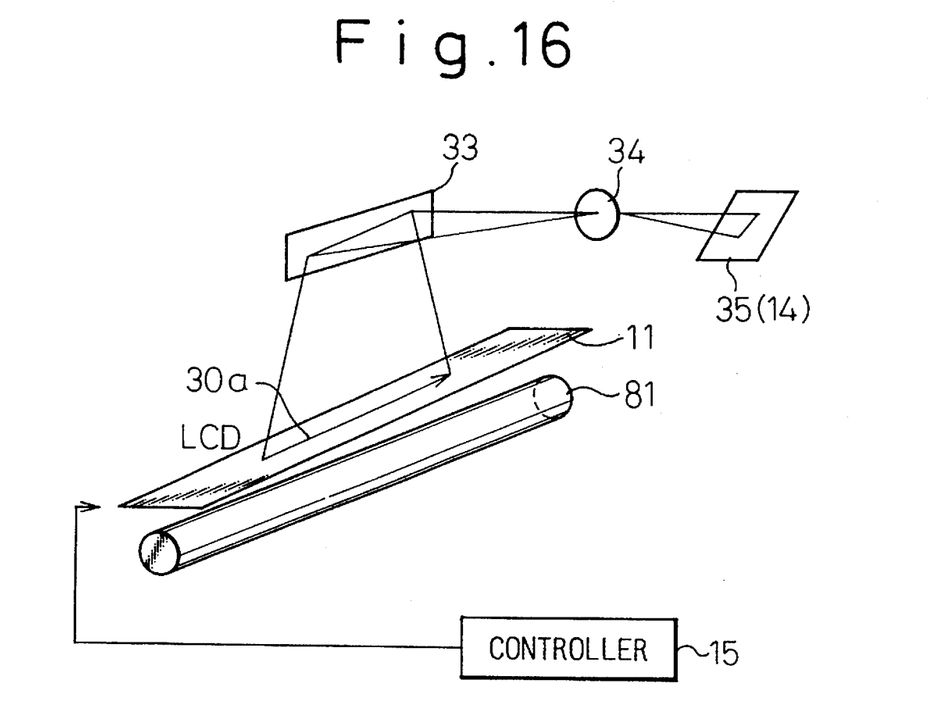
FIG. 16 is a diagrammatic perspective view of a platen according to the third embodiment of the present invention.
Figure 18A:
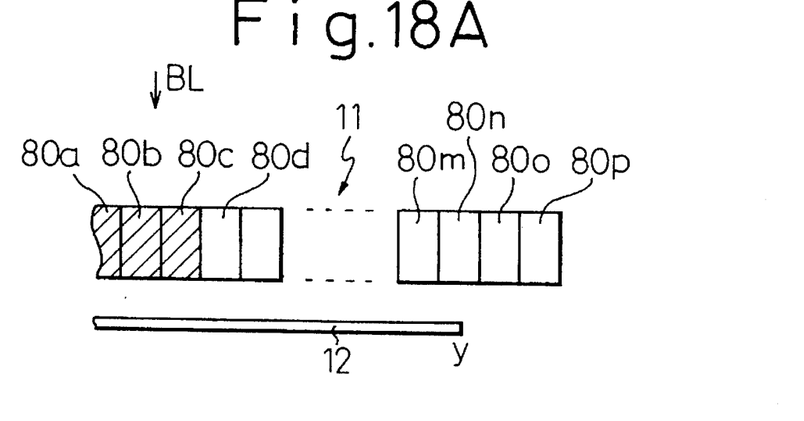
FIGS. 18A to 18C are views illustrating the operation of the platen of FIG. 16.
Figure 18B:
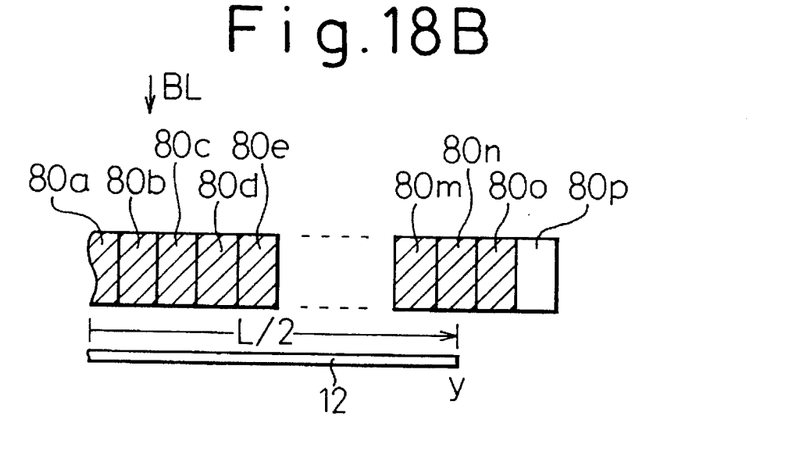
Figure 18C:
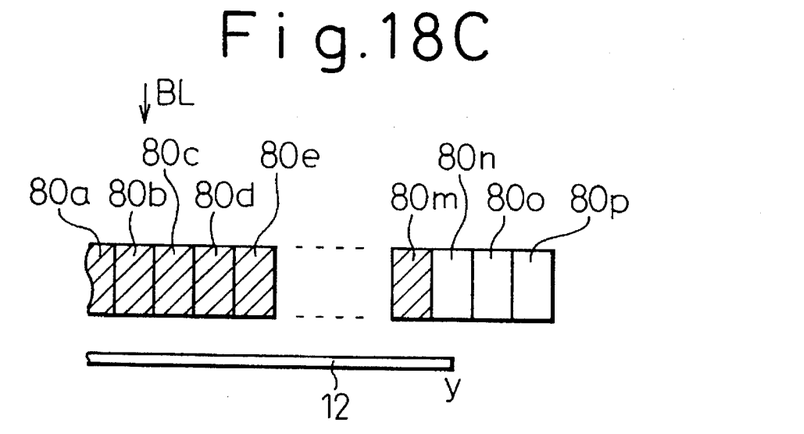

FIG. 16 shows the platen 11 of the third preferred embodiment of the present invention. It will be understood that this platen 11 can be used in the image reading device 10 of FIGS. 3 and 4, in place of the platen 11 in FIGS. 3 and 4. In FIG. 16, the platen 11 comprises a liquid crystal device (LCD) having a plurality of elements 80a to 80p (FIGS. 18A to 18C). A backlight 81 is incorporated in the liquid crystal panel.

It is possible to use a twisted nematic type of liquid crystal device for the platen 11, although the present invention is not limited to the TN liquid crystal device. Since the liquid crystal device is well known, the detailed description thereof is omitted here. Briefly, in the liquid crystal device, a liquid crystal material is inserted between a pair of opposed transparent plates and electrodes are arranged on the inner surfaces of the transparent plates. A polarizer and an analyzer are arranged outside the opposed transparent plate. Light is blocked by the liquid crystal panel when a voltage is applied between the electrodes and light is transmitted through the liquid crystal panel when a voltage is not applied.

Therefore, the portion of the liquid crystal device (the platen 11), to which the voltage is applied, corresponds to the first portion 11a of the platen 11 of FIG. 1, and another portion of the liquid crystal device (the platen 11), at which the voltage is not applied, corresponds to the second portion 11b of the platen 11 of FIG. 1.

Figure 17:
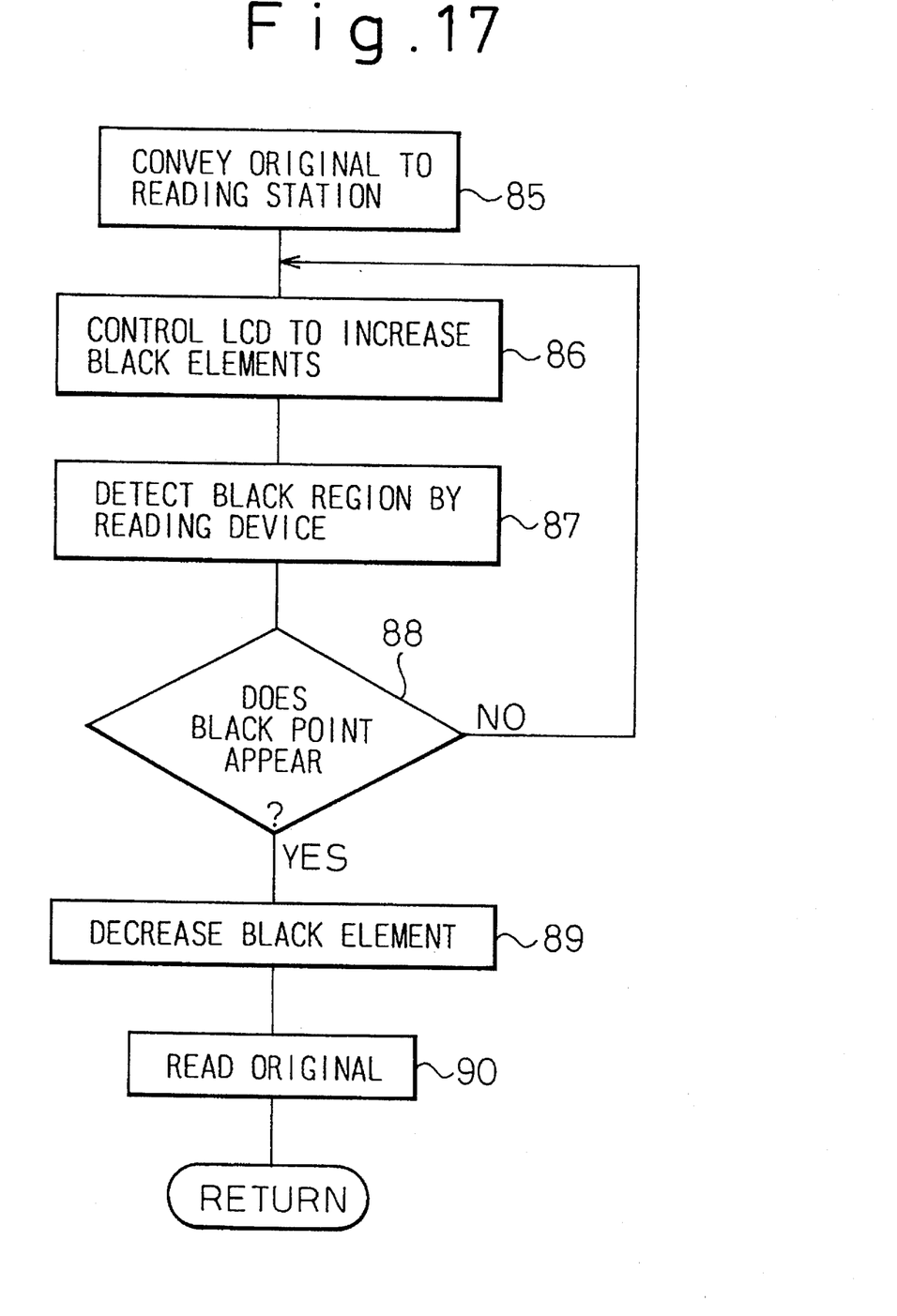
FIG. 17 is a flow chart for controlling the platen and the image reader of the third embodiment.

FIG. 17 shows a flow chart for controlling the image reading device 10 and the platen 11 in the form of the liquid crystal device. In step 85, the original 12 is conveyed to the reading station 30 so that the leading edge of the original 12 reaches the reading line 30a. In step 52, the platen 11 in the form of the liquid crystal device is controlled so as to increase the number of black elements. This is carried out by applying the voltage to one or several elements of the liquid crystal panel. In FIG. 18A, the voltage is first applied to several central elements 80a to 80c which now block the light BL from the backlight 11 and become black elements in view of the reflection and transmission of light. The voltage is then applied to elements adjacent to the black elements step by step, as shown in FIGS. 18A to 18B.

In step 87, the image sensor 14 (CCD elements 35) starts scanning to detect the black elements appearing on the reading line 30a. In step 88, it is determined whether a black point appears or not beyond the original 12. A black point will appear when the total width of the black elements becomes greater than one half of the width L of the original 12, as shown in FIG. 18B. The result of step 88 will be YES after steps 86 to 88 are repeated. In step 89, the black elements 80n and 80o are then decreased so that the total width of the black elements 80a to 80m corresponds to one half of the width L of the original 12. It is possible that more black elements are decreased so that the total width of the black elements 80a to 80m is slightly smaller than one half of the width L of the original 12. In step 90, the image sensor 14 then starts the actual scanning to read the original 12 while the original 12 is being conveyed.

As explained in greater detail, according to the present invention, it is possible to provide an image reading device which can clearly and reliably read information on an original even when a relatively thin original which includes information on both surfaces thereof is used.

I claim:

1. An image reading device comprising:

a housing having a reading station therein;

a light source for irradiating a first surface of an original with a light at the reading station;

reading means receiving a light reflected by the first surface of the original for reading information on the original to produce an image; and platen means adapted to contact a second surface of the original opposite the first surface thereof at the reading station, the platen means including first and second variable portions depending on a position of a particular original so that the first portion appears substantially black in view of the reflection and transmission of light and the second portion appears substantially white in view of the reflection and a transmission of light.

2. An image reading device according to claim 1, wherein said platen means comprises a movable member and moving means for moving the movable member in a first direction, the movable member including a substantially black region and a substantially white region, the ratio of a width of the substantially black region relative to a width of the substantially white region continuously changing by moving the movable member.

3. An image reading device according to claim 2, further comprising an inlet and an outlet arranged in said housing, means for conveying the original from the inlet through the reading station toward the outlet, detecting means for detecting a size of the original, and control means controlling said movable member in response to an output from said detecting means.

4. An image reading device according to claim 2, wherein said substantially black region is shaped in a triangular shape.

5. An image reading device according to claim 4, wherein said substantially black region is shaped in an isosceles triangular shape.

6. An image reading device according to claim 4, wherein said substantially black region is shaped in a right-angled triangular shape.

7. An image reading device according to claim 2, wherein said movable member comprises an endless belt running around rollers, and said moving means comprises means for actuating one of the rollers.

8. An image reading device according to claim 1, wherein said platen means comprises a liquid crystal device, and control means controls said liquid crystal device such that light is blocked by a region of said liquid crystal device under the original and is transmitted through another region of said liquid crystal device outside the original.

9. An image reading device according to claim 8, further comprising an inlet and an outlet arranged in said housing, means for conveying the original from the inlet through the reading station toward the outlet, detecting means for detecting a size of the original, and control means controlling said liquid crystal device in response to an output form said detecting means.

10. The image reading device as claimed in claim 9 further comprising:

wherein the transparent layer has a first side adapted to contact the second side of the original and a second side disposed opposite to a first side; and a reflective free cavity disposed immediately adjacent to the second side of the transparent layer.

11. An image reading device comprising:

a housing having a reading station therein;

a light source for irradiating a first surface of an original with a light at the reading station;

reading means receiving a light reflected by the first surface of the original for reading information on the original to produce an image; and platen means adapted to contact a second surface of the original opposite the first surface thereof at the reading station, the platen means comprising a box-shaped member including a top transparent layer, with a first side on which the original can rest and a second side of the transparent layer facing a bottom layer with an inside reflective surface.

12. An image reading device according to claim 11, wherein the top transparent layer is formed from a material selected from the group of glass and plastic.

13. An image reading device according to claim 11, wherein the inside reflective surface of the bottom layer is colored white.

14. The image reading device as claimed in claim 11 further comprising:

a first area defined by an area of the original and a second area defined by the area of the bottom layer; and wherein the second area is greater than the first area.

15. A method for controlling a platen in an image reading device comprising a housing having a reading station therein, a light source for irradiating a first surface of an original with a light at the reading station, reading means receiving a light reflected by the first surface of the original for reading information on the original to produce an image, and said platen adapted to contact a second surface of the original opposite the first surface thereof at the reading station, the platen comprising a movable member so as to provide a first portion appearing substantially black in view of a reflection and a transmission of a light and a second portion appearing substantially white in view of a reflection and a transmittion of a light, said method comprising the steps of:

detecting a size of an original to be read; and moving the movable member in response to a detected size of the original so that the first portion has a desired width at the reading station.

16. An image reading device comprising:

a housing having a reading station therein;

a light source for irradiating a first surface of an original with a light at the reading station;

reading means receiving a light reflected by the first surface of the original for reading information on the original to produce an image; and platen means adapted to contact a second surface of the original opposite the first surface thereof at the reading station, the platen means comprising a transparent layer, with a first side on which the second surface of the original can rest.

17. The image reading device as claimed in claim 16 further comprising:

wherein the transparent layer has a second side disposed opposite to the first side; and a reflective free cavity disposed immediately adjacent to the second side of the transparent layer.

18. The image reading device as claimed in claim 16 further comprising:

wherein the platen means is a box-shaped member defined partially by the transparent layer and a reflective bottom layer facing a second side of the transparent layer.

19. The image reading device as claimed in claim 16 further comprising:

wherein the transparent layer has a second side disposed opposite to the first side; and a bottom disposed opposite to the second side of the transparent layer;

a first area defined by an area of the original and a second area defined by the area of the bottom layer; and wherein the second area is greater than the first area.

\* \* \* \* \*